No. 699,493. Patented May 6, 1902.
R. N. CHAMBERLAIN.
METHOD OF CLEANING SPONGY LEAD PLATES FOR STORAGE BATTERIES.
(Application filed Nov. 9, 1900.)
(No Model.)
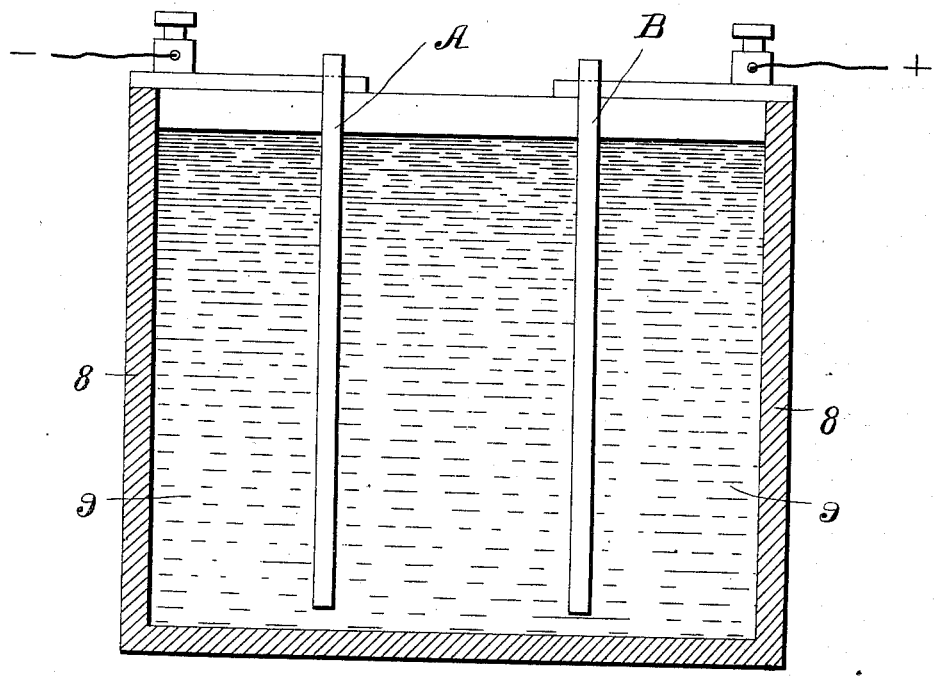

United States Patent Office.

RUFUS N. CHAMBERLAIN, OF DEPEW, NEW YORK, ASSIGNOR TO GOULD STORAGE BATTERY COMPANY, OF NEW YORK, N. Y., A CORPORATION OF WEST VIRGINIA.

METHOD OF CLEANING SPONGY LEAD PLATES FOR STORAGE BATTERIES.

SPECIFICATION forming part of Letters Patent No. 699,493, dated May 6, 1902.

Original application filed March 3, 1899, Serial No. 707,592. Divided and this application filed November 9, 1900. Serial No. 35,982. (No specimens.)

*To all whom it may concern:*

Be it known that I, RUFUS N. CHAMBERLAIN, a citizen of the United States, residing at Depew, in the county of Erie, State of New York, have invented a new and useful Method of Cleaning Spongy Lead Plates for Storage Batteries, of which the following is a specification.

In my application, No. 707,592, filed the 3d of March, 1899, of which this application is a division, I have described a method of pickling lead plates and subsequently forming storage-battery plates therefrom by exposing the successive plates as the anode in an electrolytic bath and collecting the dissolved material on a cathode-surface, by which means such anode-plate is freed from superficial glaze and impurities and has developed upon it a rough or grain surface, then removing such pickled plate to the forming-bath, in which it is first used as the anode, so as to receive a coating of oxid, and then as a cathode in the same or a similar forming-bath when a fresh pickled plate is used as the anode, so that the reduction of the oxidized surface on the first plate serves to diminish the amount of energy required to form a coating of oxid on the second plate. I have further discovered that such exposure of the oxidized plate to electrolytic action as the cathode in the forming-bath results in the reduction of the plate to the metallic state and if continued sufficiently long will more or less completely remove or neutralize the acidic elements remaining in the plate from the previous pickling and oxidizing processes. This results partly from the electrolytic movement of electronegative or acidic ions away from the cathode-plate and partly from the reducing or neutralizing effect of the hydrogen evolved. This effect is rendered more complete by continuing the electrolytic action after the complete reduction of the oxidized plate, so that the hydrogen is freely evolved and a strong cleansing action produced.

In carrying out my method of cleansing spongy lead plates I prefer to remove the reduced plates from the forming-bath to a separate bath, which may contain the usual sulfuric-acid solution, and then subject the plates to sufficient cathodic action to completely free them from any acid elements. The acetic acid thus set free and supplied to this cleansing-bath may be utilized by using as anode in such bath lead plates, which will thus be provided with a coating of oxidized material by electrochemical action. This mode of carrying out my process is particularly adapted for producing plates of a high working rate with a comparatively thin oxidized coating.

The accompanying drawing is a diagrammatic view, in vertical section, of a cleansing-bath suitable for use in carrying out my prcoess and illustrates the mode of using the same.

In the drawing, 8 represents the cleansing-vat; 9, the cleansing solution therein; A, the spongy lead plate which is being cleansed by cathodic action, and B a plate which is used as an anode. The anode and cathode terminals are indicated, respectively, by positive and negative signs. The plate A, having been previously exposed as a cathode to electrolytic action in a forming-bath sufficiently to completely reduce it and at the same time free it to a great extent of the nitric, sulfuric, and acetic salts that may have been retained therein from the previous treatments and having a surface of porous or spongy lead, is introduced as a cathode in the cleansing-bath 8, containing a solution 9 as electrolyte, which may consist of the ordinary storage-battery solution of sulfuric acid. Another lead plate B being introduced as the anode, the plate A is exposed to a strong purifying and neutralizing electrolytic action, so that when removed from the bath no traces of nitric or acetic acid are left in the said plate. The effect of the electric current is to decompose any of the free acid or dissolving agent present in the plate and to force the acid radical or ion away from the cathode and toward the anode, at the same time liberating nascent hydrogen within the plate, so as to reduce the active material thereon. Some sulfuric acid, of course, remains in it; but as this does not tend to dissolve the lead it is harmless and it can be removed, as far as necessary, by washing with water. The value of this operation depends on the fact that the plate has been previously treated in an electrolytic bath containing as an active agent a substance such as nitric or acetic acid, which will dissolve the lead and allow it to be immediately precipitated by the sulfuric acid or precipitating agent present, thereby forming an electrochemical deposit or coating of active material. In such case there is apt to remain in the plate thus formed more or less of the active dissolving agent, which will injuriously affect the plate if allowed to remain therein. Such considerations do not apply to a forming process in which there is no dissolving agent and the formation is strictly electrical.

The anode-plate B may be and preferably is a lead battery-plate, which by being thus exposed as an anode is by electrochemical action coated with oxidized material—namely, oxid of lead. The acetic acid which is taken up from the cathode-plate A by the solution contributes to this effect by this dissolving action, which in connection with the current causes an electrochemical deposit to be formed, as above explained. This coating on the plate B will be thin; but such plates will be useful as storage-battery plates for some purposes—as, for example, where high discharge rate is of more importance than capacity in ampere-hours. By this means the energy which would otherwise be wasted in setting free oxygen at the anode is applied to a useful purpose.

Having thus described my invention, the following is what I claim as new therein and desire to secure by Letters Patent:

1. The process of cleansing a spongy lead plate from the active dissolving agent of an electrochemical forming-bath which consists in exposing said plate as a cathode in an electrolytic bath, such bath containing a solution relatively free from such active agent.

2. The process of cleansing a spongy lead plate and simultaneously oxidizing another plate which consists in exposing said plates respectively as cathode and anode in an electrolytic bath.

RUFUS N. CHAMBERLAIN.

Witnesses:
  J. GREEN,
  A. P. KNIGHT.